US012516776B2

(12) United States Patent
Gauvreau, III

(10) Patent No.: US 12,516,776 B2
(45) Date of Patent: Jan. 6, 2026

(54) GARAGE DOOR LUBRICATING SYSTEM AND METHOD

(71) Applicant: Bristol Rolling Door LLC, Levittown, PA (US)

(72) Inventor: Gerald J. Gauvreau, III, Furlong, PA (US)

(73) Assignee: Bristol Rolling Door LLC, Levittown, PA (US)

( * ) Notice: Subject to any disclaimer, the term of this patent is extended or adjusted under 35 U.S.C. 154(b) by 0 days.

(21) Appl. No.: 18/769,859

(22) Filed: Jul. 11, 2024

(65) Prior Publication Data

US 2025/0020275 A1 Jan. 16, 2025

Related U.S. Application Data

(60) Provisional application No. 63/526,593, filed on Jul. 13, 2023.

(51) Int. Cl.
*F16N 7/14* (2006.01)
*E05D 15/24* (2006.01)

(52) U.S. Cl.
CPC ............... *F16N 7/14* (2013.01); *E05D 15/24* (2013.01); *E05Y 2900/106* (2013.01)

(58) Field of Classification Search
CPC ......... F16N 7/14; E05D 15/24; E05D 15/165; E05Y 2900/106; E05Y 2800/412
See application file for complete search history.

(56) References Cited

U.S. PATENT DOCUMENTS 1,698,675 A * 1/1929 Cromer .................... E05D 15/24 160/202
2,310,585 A * 2/1943 Lawson .................. A22B 7/001 134/40
4,030,178 A * 6/1977 Luebkemann ......... B62D 55/15 384/402
6,536,077 B1 * 3/2003 Espey .................... E05D 15/165 49/420

* cited by examiner

*Primary Examiner* — Anna M Momper
*Assistant Examiner* — Mark K Buse
(74) *Attorney, Agent, or Firm* — Duane Morris LLP

(57) ABSTRACT

In accordance with some embodiments, a device for lubricating garage door tracks is provided. The device may comprise a reservoir. The reservoir may be configured for frictional engagement with a lower end of a garage door track. The reservoir may comprises a horizontal surface, four walls, and an opening. Each of the four walls may have and upper end and a lower end. The lower end of each wall may be connected to the horizontal surface, thereby defining a fluid reservoir. The fluid reservoir may be bounded by an inner surface of each wall and the horizontal surface, and may retain a lubricating substance. The opening may be defined by the upper end of the four walls, and the opening may be dimensioned for frictional engagement with a lower end of a garage door track. At least one of the walls may have a height dimensioned so that a portion of a garage door roller is accepted into the reservoir when the garage door is fully closed.

20 Claims, 11 Drawing Sheets

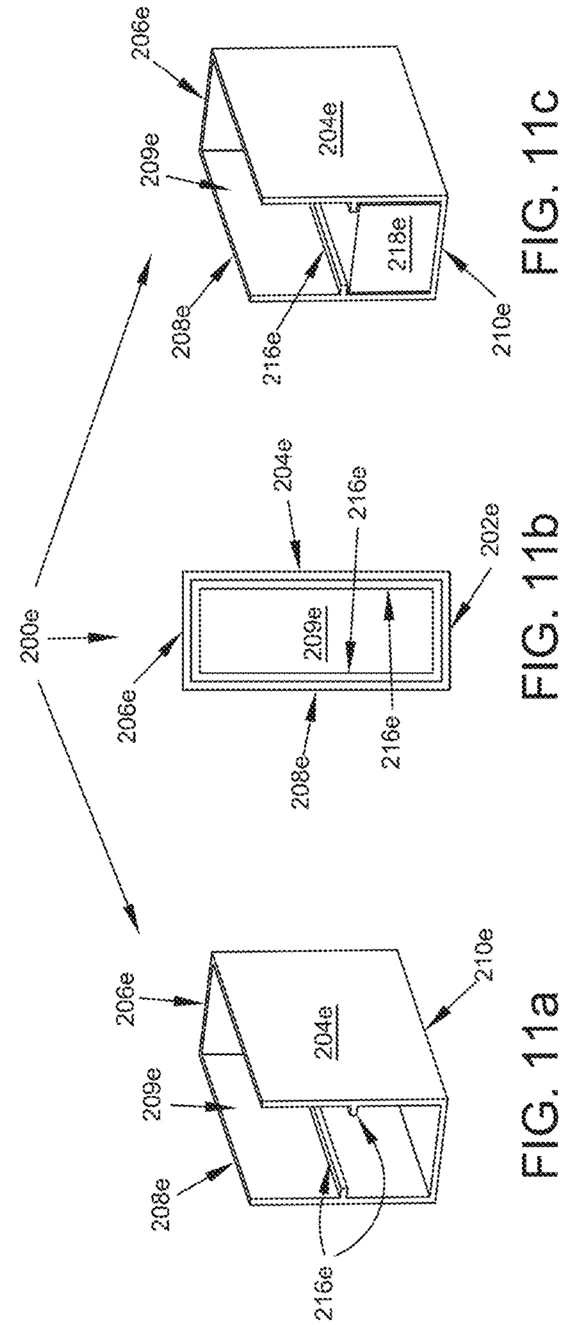
FIG. 11a
FIG. 11b
FIG. 11c
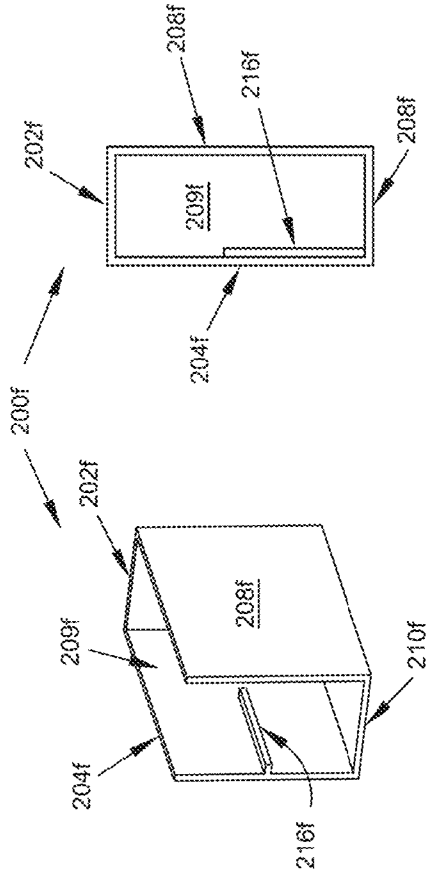
FIG. 12a
FIG. 12b

GARAGE DOOR LUBRICATING SYSTEM AND METHOD

CROSS-REFERENCE TO RELATED APPLICATIONS

The application claims priority to provisional application No. 63/526,593, titled "Garage Door Lubricating System and Method," filed Jul. 13, 2023, which is hereby incorporated by reference in its entirety herein.

FIELD OF INVENTION

The disclosure generally relates to garage doors and, more specifically, systems and methods for lubricating garage door tracks and components.

BACKGROUND

Prior methods of lubricating (e.g., oiling) garage door tracks, and the components cooperating therewith (e.g., rollers), often involve sequentially lubricating individual rollers from highest to lowest roller with a garage door shut. Garage door systems and methods need improvement.

FIG. 1 illustrates a prior art garage door 100 that may incorporate the lubricating systems and methods described herein. The garage door 100 may comprise various panels or sections 102, hinges 104 and bracket 106, track 108, and rollers 110. Panels or sections 102 are connected to one another using hinges 104 that enable the panels to move relative to one another as the garage door 100 transitions from a closed state (as shown in FIG. 1) to a partially or fully open state (not shown in FIG. 1). Hinges 104 also couple the sections 102 to the track 108 via rollers 110 and stems 112. The movement of rollers 110 is constrained by track 108, thereby also constraining the movement of the sections 102 as the garage door 100 is opened and closed. This constraining of the sections 102 provides a smoother operation of the door 100.

FIG. 2 illustrates a close-up view of a lower end 114 the garage door 100 of FIG. 1. Illustrated are the lowest section 102, bracket 106, track 108, and roller 110. Bracket 106 similarly couples the section 102 to track 108 via roller 110 and stem 112 to constrain the movement of section 102 during operation. However, as there is no section below section 102, bracket 106 need not include a hinging mechanism to allow relative movement between two adjacent sections 102. As can be seen in FIGS. 1 and 2, roller 110 is coupled to section 102 via bracket 106 and stem 112. This coupling allows the roller 110 to rotate along and within the track 108, as well as rotate relative to section 102. A similar coupling is provided between the rollers 110 and hinges 104 shown in FIG. 1.

A common problem associated with the garage door illustrated in FIGS. 1 and 2 was lubricating the roller 110, track 108 and any bearings associated with the roller (not shown) to maintain the smooth operation of the garage door. Current methods of lubricating the rollers 110 may include applying a lubricant to an uppermost roller 110 and its bearings (not shown) in each of the two tracks 108. A portion of this lubricant may then travel down the track 108 to lower rollers 110 that themselves may be also separately lubricated. Another prior art method includes individually lubricating each roller 100 and its bearings in both tracks 108. Yet, another method includes lubricating the entirety of interior of both tracks. Using any of the prior art methods, eventually, gravity may cause some of the lubricate to drip or to flow past the lower end 114 of both tracks 108 and onto the garage floor. This dripped lubricant may cause a slip hazard. Additionally, this lubricant may flow into the environment causing a hazard thereto, particularly for locations that have not installed systems to prevent the discharge of such fluids into the environment. Losing the lubricant from the garage door tracks is also wasteful of the lubricant. Various embodiments described in the present disclosure provide for improved lubricating of garage door tracks and address these issues.

SUMMARY

The systems and methods, as disclosed by the various embodiments herein, provides many benefits over prior methods when lubricating a garage door and its components such as those shown in FIGS. 1 and 2. For example, the garage door lubricating systems described herein may provide for a more efficient means to lubricating the garage door tracks by utilizing the movement of the rollers to effect the lubricating—i.e., various embodiments provide a "self-lubricating" system. Further, the various embodiments reduce the likelihood of the lubricating oil flowing away from the garage and potentially into the environment and/or creating slip hazards compared to prior systems and methods. This may also include capturing in a reservoir any lubricant that would otherwise drip from the garage door tracks, for example, by lubricating individual rollers. Yet another benefit provided by various embodiments disclosed herein include improved protection from corrosion to the garage door tracks, particularly those most frequently exposed to the elements.

In accordance with some embodiments, a device for lubricating garage door tracks is provided. The device may comprise a reservoir. The reservoir may be configured for frictional engagement with a lower end of a garage door track. The reservoir may comprises a horizontal surface, four walls, and an opening. Each of the four walls may have and upper end and a lower end. The lower end of each wall may be connected to the horizontal surface, thereby defining a fluid reservoir. The fluid reservoir may be bounded by an inner surface of each wall and the horizontal surface and may retain a lubricating substance. The opening may be defined by the upper end of the four walls, and the opening may be dimensioned for frictional engagement with a lower end of a garage door track. At least one of the walls may have a height dimensioned so that a portion of a garage door roller is accepted into the reservoir when the garage door is fully closed.

In accordance with some embodiments, a method of lubricating a garage door track is provided. The method may comprise placing a fluid reservoir in cooperating engagement with a lower end of a garage door track. The method may further comprise adding a lubricant to the fluid reservoir. The method may further comprise lowering the garage door so that at least a portion of a roller of the garage door is received into the reservoir. The method may further comprise opening the garage door to thereby move the roller from the reservoir and along the track of the garage door.

In accordance with some embodiments, a system for lubricating a garage door track is provided. The system may comprise a fluid reservoir located at a lower end of the garage door track. The reservoir may comprise a horizontal surface, one or more vertical surfaces, and an opening. The one or more vertical surfaces may be operably coupled to the horizontal surface thereby defining a fluid reservoir. The fluid reservoir may be bounded by an inner surface of each of the one or more vertical surfaces and the horizontal surface, and may be used for the retention of a lubricating substance. The opening may be defined by the upper end of the one or more vertical surfaces and dimensioned for the acceptance of a garage door roller and for cooperating with the garage door track.

BRIEF DESCRIPTION OF THE DRAWINGS

FIG. 11*a*-11*c* illustrate various views of a sixth embodiment of a garage door lubricating system in accordance with the present disclosure.

FIG. 12*a*-12*b* illustrate various views of a seventh embodiment of a garage door lubricating system in accordance with the present disclosure.

DETAILED DESCRIPTION

Figure 1:
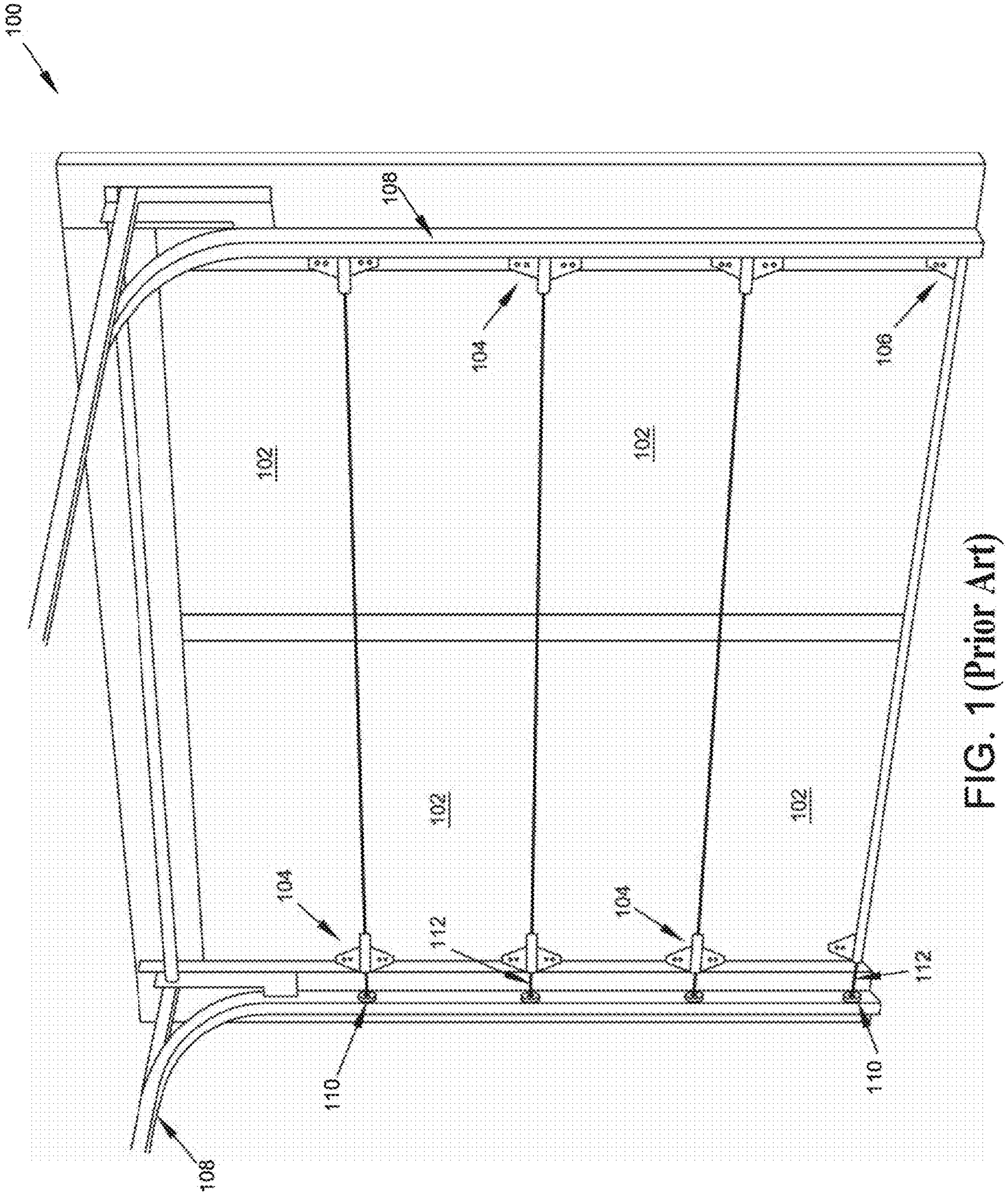
FIG. 1 (Prior Art)
FIG. 1 illustrates a simplified drawing of a prior art garage door suitable for use with an embodiment of the present disclosure.

Various embodiments will now be described in detail with reference to the figures. Like reference numerals refer to like elements. One of ordinary skill in the art will appreciate the applicability of the teachings of the detailed description to other embodiments. While embodiments of the present invention will be described in detail, it is to be understood that the embodiments described are illustrative only and the scope of the invention is to be defined solely by the claims and their full range of equivalence.

Figure 3:
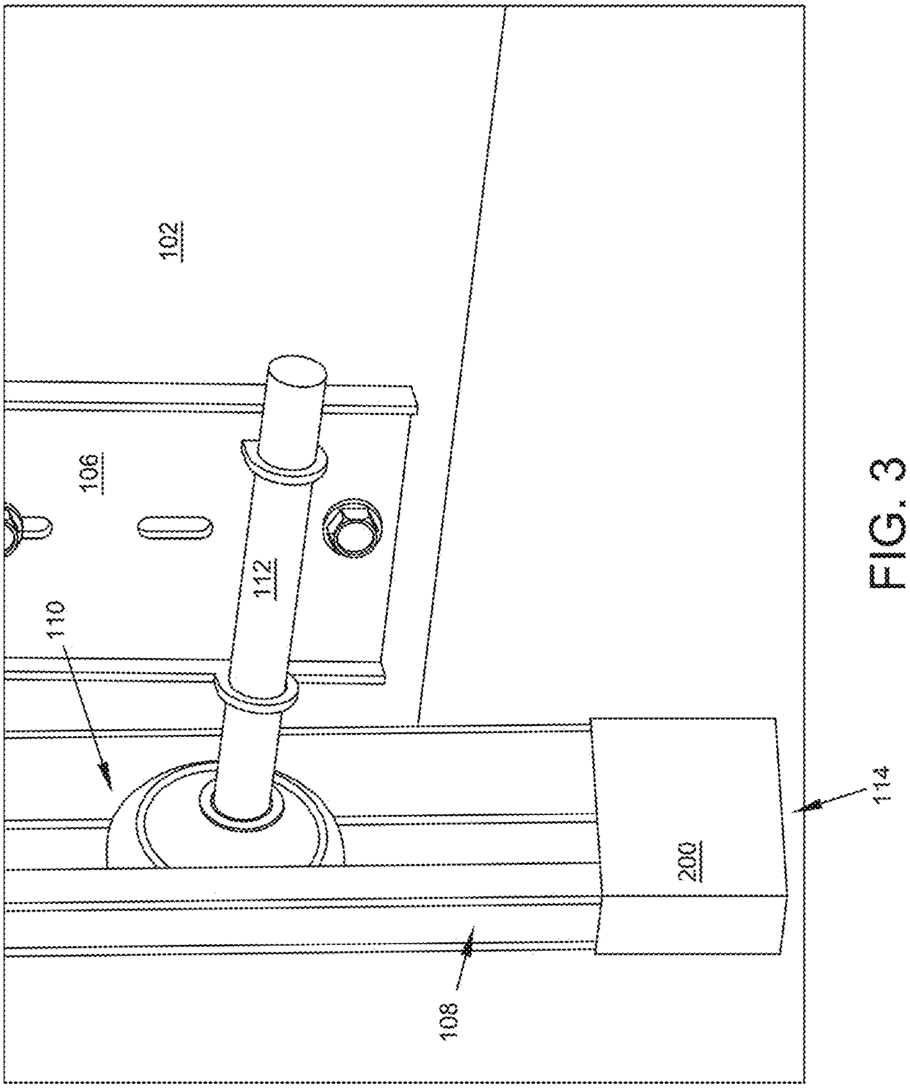
FIG. 3 illustrates an embodiment of garage door lubricating system in accordance with the present disclosure.

FIG. 3 illustrates an embodiment of garage door lubricating system, with the garage door open, in accordance with the present disclosure. The system may comprise a reservoir 200 located at the lower end 114 of each garage door track 108. Reservoir 200 may define, at least in part, a fluid reservoir for the retention of a lubricating substance.

Figures 6A, 6B, 6C, 6D, 6E:
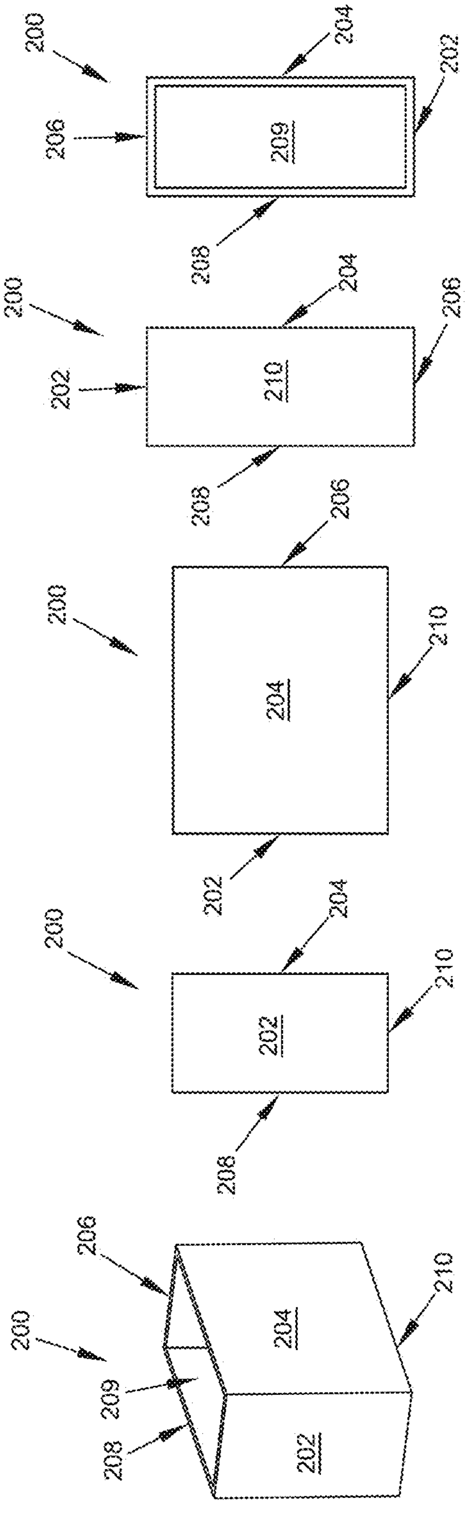
FIGS. 6*a*-6*e* illustrate various views of the garage door lubricating system of FIGS. 3 and 4 in accordance with the present disclosure.

FIGS. 6*a*-6*e* illustrate various views of the reservoir 200 of FIG. 3 in accordance with the present disclosure. FIG. 6*a* provides a perspective view of reservoir 200. Reservoir 200 may comprise a front wall 202, a rear wall 206, a first side wall 204, a second side wall 208, and a lower horizontal surface 210. FIG. 6*b* provides a front elevation view of reservoir 200. A rear elevation view of reservoir 200 would look substantially similar to FIG. 6*b*. FIG. 6*c* provides a side elevation view of the first side wall 204. A side elevation view of the second side wall 208 would look substantially similar to FIG. 6*c*. FIG. 6*d* provides a bottom view of the reservoir 200. FIG. 6*e* provides a top view of reservoir 200.

Each wall 202 to 208 may have an upper end and a lower end. The lower end of each wall 202 to 208 may be connected to the horizontal surface 210, thereby defining the fluid reservoir for the retention of a lubricating substance. Each of the walls 202 to 208 and horizontal surface 210 may be solid and made of a material to prevent the passing of the lubricant there through. The fluid reservoir may be bounded by an inner surface of each walls 202 to 208 and the horizontal surface 210. An opening 209 may defined by the upper end of the walls 202 to 208. The opening 209 may be dimensioned to cooperate with the garage door track to enable the operable engagement therewith. For example, the reservoir 200 may be dimensioned for frictional engagement with the lower end 114 of the garage door tack 108, thereby maintain the reservoir in place during operation of the garage door. This dimensioning may account for different sized tracks, e.g., two or three inch tracks as are known in the industry.

In some embodiments, the reservoir, such as reservoir 200, may be secured using additional and/or alternative means. For example, the reservoir may be clamped to the track 108. In some embodiments, the reservoir may be semi-permanently attached using by, for example, welding the reservoir to track 108 and/or using an adhesive. In some embodiments reservoir may be operatively coupled and/or supported by another structure such as, for example, the ground or floor or a support structure, which may also support the garage door.

Figure 4:
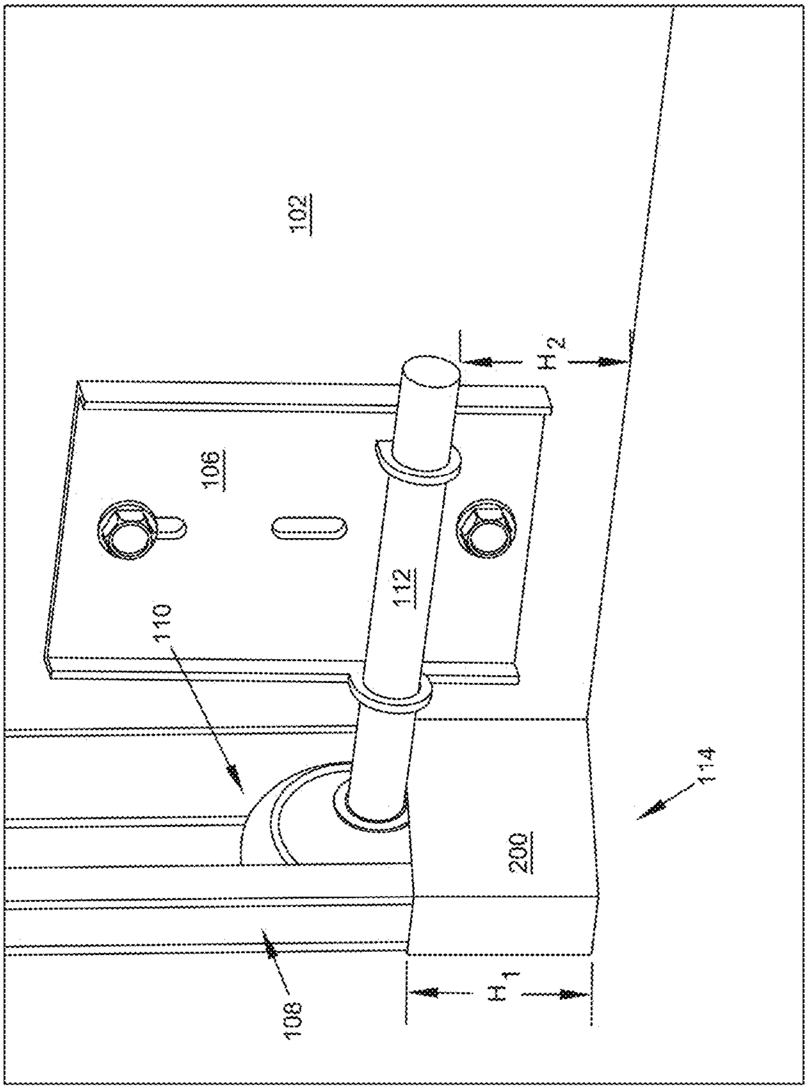
FIG. 4 illustrates the garage door lubricating system of FIG. 3 with the garage door closed.

Opening 209 may be of a sufficient size to accept a portion of the roller 110 into the reservoir 200, as is shown in FIG. 4. This feature enables the lower roller 110 to be at least partially covered in the lubricating substance retained in the reservoir 200. When the garage door is opened the lubricating substance will be transferred by the lower roller 110 onto the garage track 108 and, in turn, may be transfer to other rollers 110. Additionally, the lower end 114 of the garage track will be maintained in a bath of the lubricating substance, reducing the opportunity of corrosion thereto.

Reservoir 200 may also have walls 202 to 208 of an appropriate height for the acceptance of the roller 110 without interfering with the operation of the garage door. For example, in some embodiments, when the garage door is fully closed, the upper end of one of the walls may have a height, $H_1$ as shown in FIG. 4, that is slightly less than the height, $H_2$, of the lower end of the stem 112 of roller 110. $H_2$ may be measured from a lower surface, e.g., the floor of the garage, to the lower end of stem 112. By making $H_1$ slightly less than the height $H_2$, the portion of the roller 110 that will covered by the lubricating substance can be maximized without interfering with the operation of the garage door or risking spilling of oil retained in reservoir 200 through the deformation of one of its sides. In some embodiments, $H_1$ may be other heights while still preventing interference with components of the garage door system other than the roller stem 112. For example, $H_1$ may be substantially the same as the height along the track 108 measured from the bottom of the stem 112 to the lower end 114 of track 108. This height may allow the lower surface 210 to be in contact with track 108 while still avoiding interference with stems 112. In other embodiments, there may be a gap between the lower end of the track 108 and the inner surface of lower surface 210. In some embodiments, the height of one or more of the walls 202 to 208 may be approximately an inch. In some embodiments, the height of one or more of the walls 202 to 208 may be approximately two inches.

Figure 2:
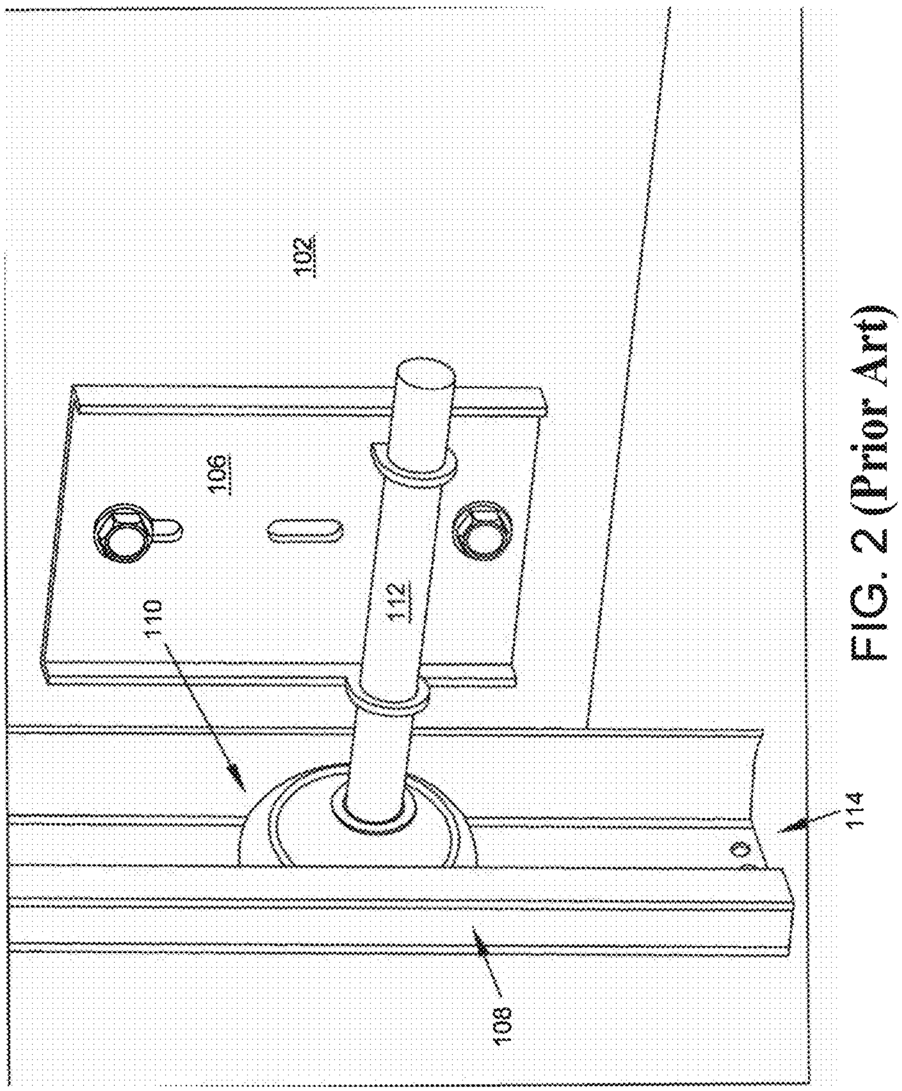
FIG. 2 (Prior Art)
FIG. 2 illustrates a close-up view of the prior art garage door of FIG. 1.

In some embodiments, the reservoir, such as reservoir 200, may be a device that comprises only the walls and lower horizontal surface necessary to for a reservoir to be formed when in operational engagement with the track 108. For example, for the track 108 shown in in FIG. 2, this may comprise a lower horizontal surface and two vertical walls. The first vertical wall may have a height sufficient to cover any holes in the track 108, such as the two holes shown in FIG. 2. The second vertical wall may close off the open section of the track 108 and have a height, e.g., $H_1$. Together, the track 108 and these portions may form the fluid reservoir.

Figures 7A, 7B, 7C, 7D, 7E:
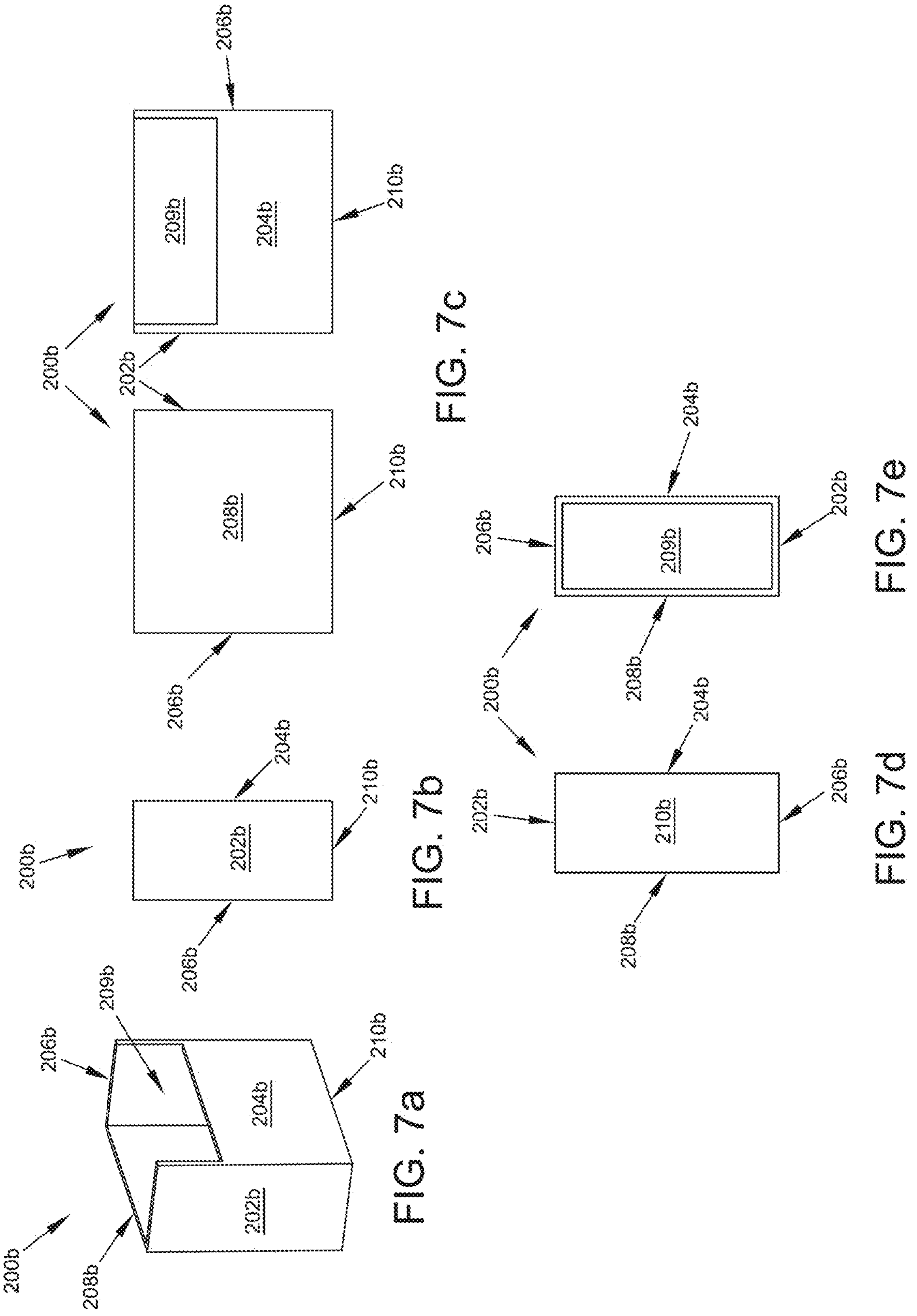
FIGS. 7*a*-7*e* illustrate various views of a third embodiment of a garage door lubricating system in accordance with the present disclosure.

In some embodiments, one or more walls may have a height different than one or more other walls of the reservoir. Such an embodiment is shown in FIGS. 7*a*-7*e*. FIGS. 7*a*-7*e* illustrate various views of the reservoir 200*b* in accordance with an embodiment of the present disclosure. FIG. 7*a* provides a perspective view of reservoir 200*b*. Reservoir 200*b* may comprise a front wall 202*b*, a rear wall 206*b*, a first side wall 204*b*, a second side wall 208*b*, and a lower horizontal surface 210*b*. FIG. 7*b* provides a front elevation view of reservoir 200*b*. A rear elevation view of reservoir 200*b* would look substantially similar to FIG. 7*b*. FIG. 7*c* provides a side elevation view of the first side wall 204*b* and a second elevation view of second side wall 208*b*. FIG. 7*d* provides a bottom view of the reservoir 200*b*. FIG. 7*e* provides a top view of reservoir 200*b*.

As can be seen in these figures, wall 204*b* has a height less than walls 202*b* to 208*b*. This difference in height may provide for increased engagement with the track 108 while still providing the necessary clearance for any moving components of the garage door, e.g., the roller 110 and its stem 112.

Figure 8A:
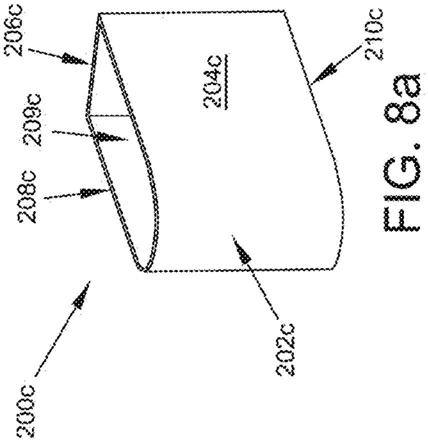
FIGS. 8*a*-8*e* illustrate various views of a fourth embodiment of a garage door lubricating system in accordance with the present disclosure.
Figure 8B:
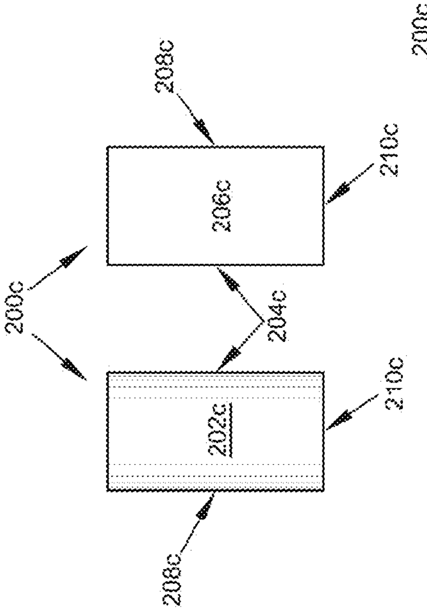
Figure 8C:
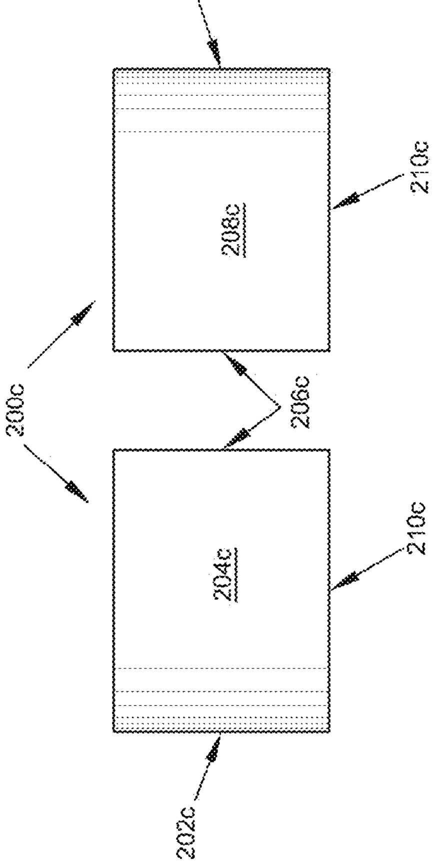
Figure 8D:
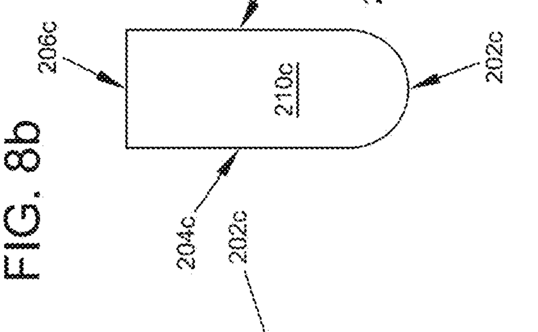
Figure 8E:
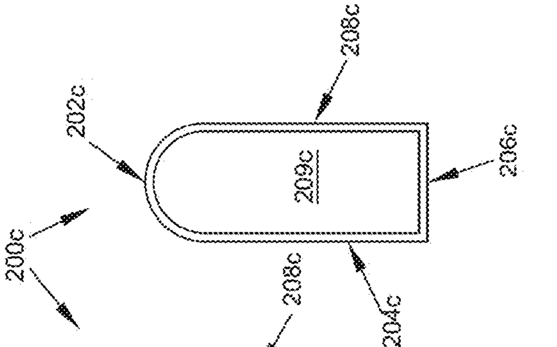

The reservoir may also take different shapes to accommodate the different shapes and dimension of garage door tracks. For example, FIGS. 8*a*-8*e* illustrate various views of a fourth embodiment of a garage door lubricating system in accordance with the present disclosure. FIG. 8*a* provides a perspective view of reservoir 200*c*. Reservoir 200*c* may comprise a front wall 202*c*, a rear wall 206*c*, a first side wall 204*c*, a second side wall 208*c*, and a lower horizontal surface 210*c*. FIG. 8*b* provides a front elevation view and a rear elevation view of reservoir 200*c*. FIG. 8*c* provides a side elevation view of the first side wall 204*c* and a second side elevation view of the second side wall 208*c*. FIG. 8*d* provides a bottom view of the reservoir 200*c*. FIG. 8*e* provides a top view of reservoir 200*c*.

As can be seen in FIGS. 8*a*-8*e*, the front wall 202*c* comprises a substantially rounded shape and the first side wall 204*c* and the second side wall 208*c* are flat. This rounded shape may follow, or mimic, the rounded shape a track 108, thereby providing for a closer fit and enhancing the engagement between the two. In other embodiments, front wall 202*c*, or other walls or surfaces of the reservoir may be shaped to better conform a garage door track 108.

In accordance with some embodiments, the reservoir may cooperate with the track 108 in a manner that does not require the track 108 to support the reservoir. For example, the reservoir may rest on the floor of the garage. While the reservoir does not engage track 108 for support, it may nevertheless be dimensioned to cooperate with in close fitment with track 108. This close fitment may reduce the likelihood of foreign materials entering the reservoir, maintain the relative position of the reservoir with respect to the track, and help maintain the desired level of lubricant in the reservoir.

Figure 9A:
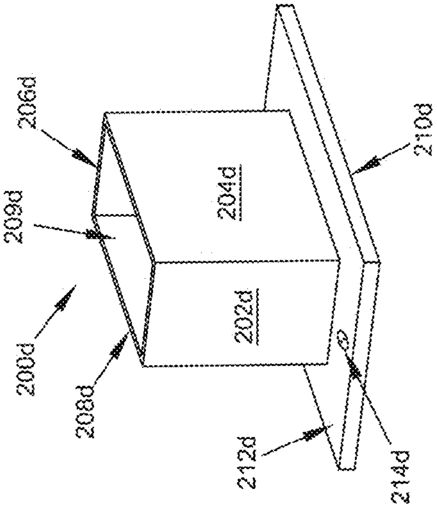
FIGS. 9*a*-9*e* illustrate various views of a fifth embodiment of a garage door lubricating system in accordance with the present disclosure.
Figure 9B:
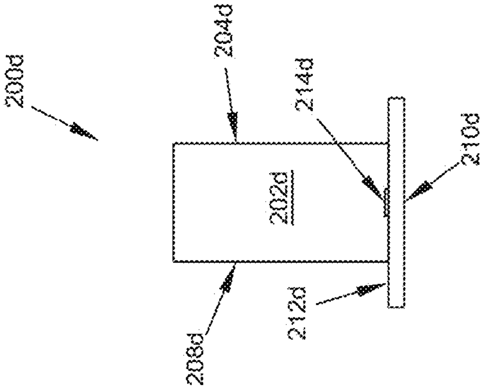
Figure 9C:
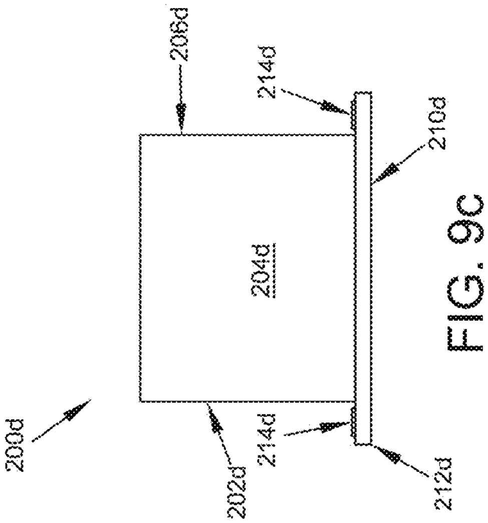
Figure 9D:
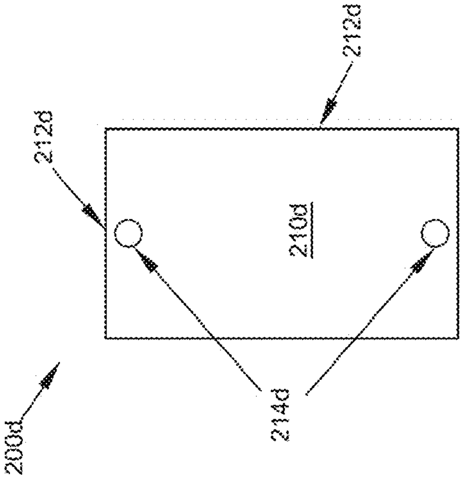
Figure 9E:
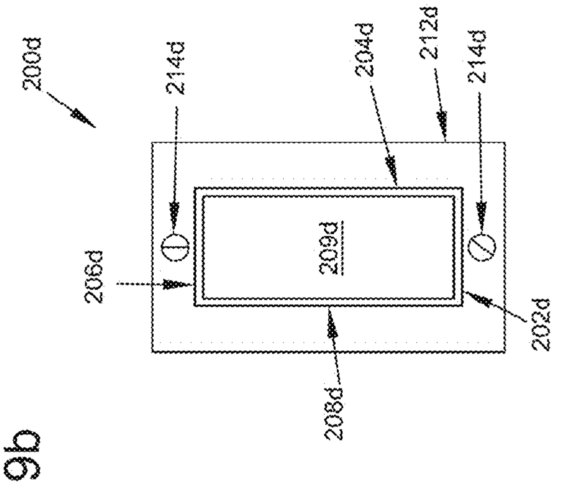
Figure 10:
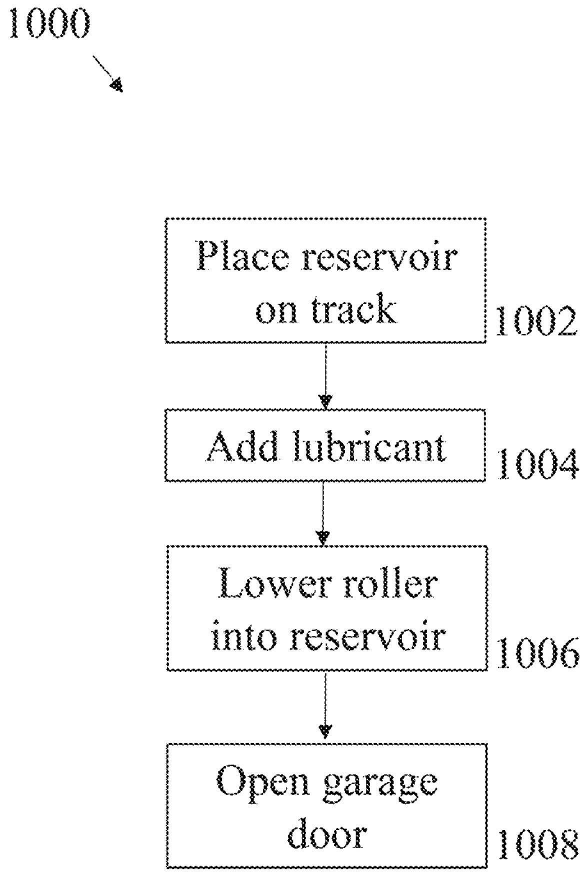
FIG. 10 shows a method of lubricating a garage door in accordance with the present disclosure.

Such an example is illustrated in FIGS. 9*a*-9*e*. FIGS. 9*a*-9*e* illustrate various views of the reservoir 200*d*. FIG. 9*a* provides a perspective view of reservoir 200*d*. Reservoir 200*d* may comprise a front wall 202*d*, a rear wall 206*d*, a first side wall 204*d*, a second side wall 208*d*, a lower horizontal surface 210*d*, and a base 212*d*. FIG. 9*b* provides a front elevation view of reservoir 200*d*. A rear elevation view of reservoir 200*d* would look substantially similar to FIG. 9*b*. FIG. 9*c* provides a side elevation view of the first side wall 204*d*. A side elevation view of the second side wall 208*d* would look substantially similar to FIG. 9*c*. FIG. 9*d* provides a bottom view of the reservoir 200*d*. FIG. 9*e* provides a top view of reservoir 200*d*.

As can be seen, reservoir 200*d* also comprises a base 212*d*. Base 212*d* may engage the ground and increase the height of the inner surface of the lower surface 210*d* above the ground. Base 212*d* may further provide for a fastening or securement means 214*d* to maintain the reservoir in place. For example, means 214*d* may be a screw, bolt, or nail or other device. In some embodiments, the base 212*d* may be weighted to reduce the likelihood of the reservoir moving.

In accordance with some embodiments, the reservoir may further comprise a lubricant (e.g., oil) absorbent material (e.g., a sponge). Such an example is illustrated in FIGS. 11*a*-11*c* that show various views of a reservoir 200*e*. FIG. 11*a* provides a cutaway, perspective view of reservoir 200*e*, without the lubricant absorbent material 218*e* placed therein and wherein the front wall 202*e* is not shown due to the cutaway nature of the FIG. 11*a*. Reservoir 200*e* may comprise a front wall 202*e*, a rear wall 206*e*, a first side wall 204*e*, a second side wall 208*e*, a lower horizontal surface 210*e*, and a retention component 216*e*. The front elevation view, rear elevation view, side elevation view of the first side wall 204*e*, side elevation view of the second side wall 208*e*, and bottom view of the reservoir 200*e* would look the same as the reservoir 200 as illustrated in FIG. 6*b*-6*d*.

Reservoir 200*e* may further comprise a lubricant absorbent material 218*e*, which may be a sponge. Such an example of the lubricant absorbent material 218*e* is illustrated in FIG. 11*c*. Lubricant absorbent material 218*e* may be placed in a lower portion of the reservoir 200*e* to absorb and retain the lubricant. This absorption helps maintain foreign material out of the lubricant and helps minimize and/or prevent the lubricant from being splashed out of the reservoir during the operation of the garage or if an object is dropped into the reservoir 200*e*. Lubricant absorbent material 218*e* also makes it easier and more efficient to remove the lubricating substance from the reservoir because the user need to only grab the lubricant absorbent material 218*e*. In some embodiments, the lubricant absorbent material 218*e* is made a relatively compliant, flexible, and/or resilient material that enable the lubricant absorbent material 218*e* to be pushed out of the way by a roller 110 or by the operator while returning to its shape when the roller is moved upward during opening of the door, but resilient enough to prevent deformation when smaller forces are place onto it, e.g., due to the collection of dust, leaves, or other minor debris.

While the lubricant absorbent material 218*e* shown in FIG. 11*c* is rectangular, in some embodiments the lubricant absorbent material 218*e* may be shaped to conform to other objects, e.g., a roller 110. Such embodiments allow for the use of lubricant absorbent material 218*e* that is not deflectable by the movement of the roller 110 without interfering with the operation of the garage.

Lubricant absorbent material 218*e* may be frictionally fit against the inner surfaces of the reservoir 200*e*. In some embodiments, lubricant absorbent material 218*e* may be affixed to reservoir 200*e* using an adhesive, preferably of a strength small enough to prevent the lubricant absorbent material 218*e* from tearing but strong enough to prevent the unintentional removal of the lubricant absorbent material 218*e* from the reservoir 200*e*.

In some embodiments, the reservoir 200*e* may have a retention component, such as 216*e*, integrated therein to help maintain the lubricant absorbent material 218*e* in the reservoir. An example of the retention component 216*e* is illustrated in FIGS. 11*a*-11*c*. The retention component extends inwardly from the inner surfaces of the various walls 202*e*-208*e* to provide a lip underneath which the lubricant absorbent material 218*e* can be tucked. The particular height of the retention component 216*e* above the bottom inner surface and the height of the lubricant absorbent material 218*e* can be varied. For example, for more flexible materials, the height of the retention component 216*e* and lubricant absorbent material 218*e* may be up to the height of the roller, whereas less flexible may be lower to avoid preventing the garage door from closing. Also, retention component 216*e* may extend around the inner surface of the reservoir 200*e* as shown.

In some embodiments, retention component 216*e* may extend only around a portion of the inner surface of the reservoir. An example of such an embodiment is shown in FIGS. 12*a*-12*b*. Reservoir 200*f* may comprise a front wall 202*f*, a rear wall 206*f*, a first side wall 204*f*, a second side wall 208*f*, a lower horizontal surface 210*f*, and a retention component 216*f*. The front elevation view, rear elevation view, side elevation view of the first side wall 204*f*, side elevation view of the second side wall 208*f*, and bottom view of the reservoir 200*f* would look the same as the reservoir 200 as illustrated in FIG. 6*b*-6*d*.

Retention component 216*e* may extend only over the open area between the sides of the tracks 108 through switch the stem 112 moves. This design enables a closer fit of the reservoir 200*e* to track without interfering with the operation of the roller 110 while still providing retention of the lubricant absorbent material 218*e*. Further, the retention component 216*f* may extend from the inner surface of, as shown, 204*f*, by a distance that is substantially the same as the thickness of the track 108 walls, thereby ensuring that the roller 110 can clear the retention component 216*f* without interference.

The various embodiments of the reservoirs described herein may be constructed from different types of materials. For example, the reservoir may be a made of a flexible material. Flexible materials may include rubber, plastic, vinyl silicone, neoprene, etc. Using flexible materials, the various reservoirs may be stretched over the track 108 to provide a closer and more secure fitment thereto. Other materials may include harder plastics, metals, and other relatively less flexible materials.

The reservoirs described herein may be constructed by any of a number of methods. For example, the reservoir may be molded, cast, poured, or 3D printed. The walls may be constructed as a single, continuous piece, or as separate pieces that are than attached to one another.

Figure 5:
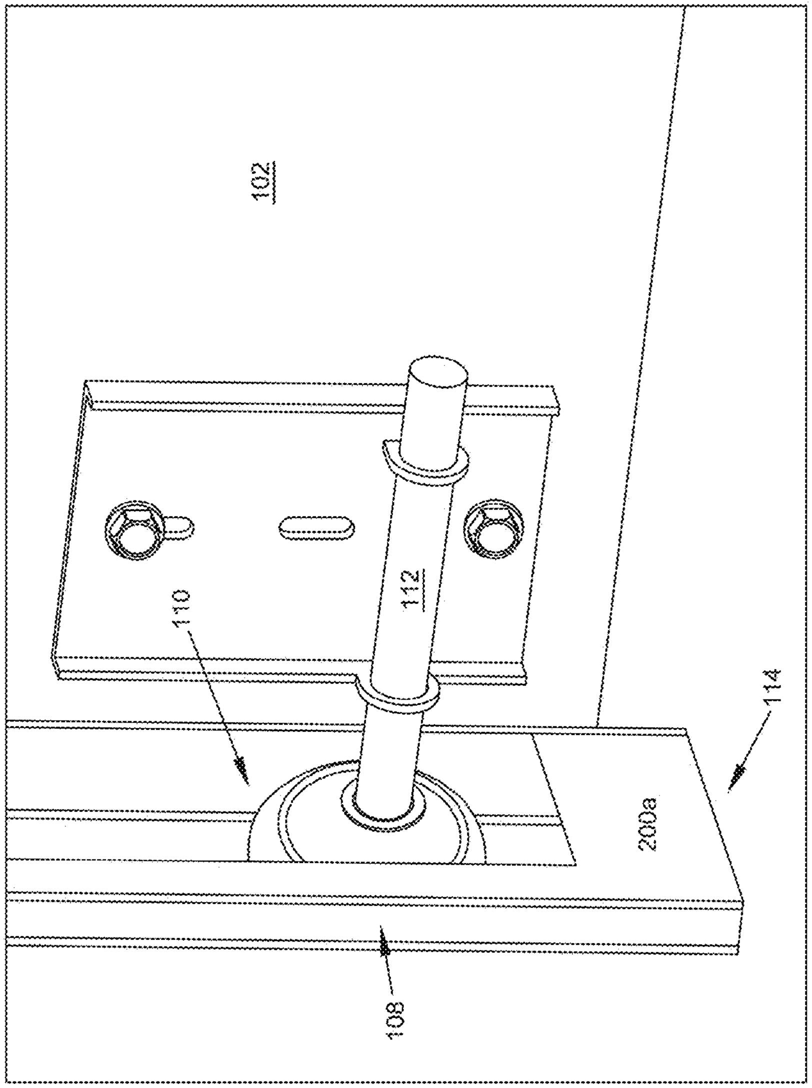
FIG. 5 illustrates a second embodiment of the garage door lubricating system integrated in accordance with the present disclosure.

While in some embodiments the reservoir may be a separate component that is removably attached to a track 108, in others the reservoir may be an integral part of the track 108. An example of such a reservoir 200*a* is provided for in FIG. 5. As can be seen, a portion of the lower end 114 of track 108 may be horizontally extended to engage another side track 108. Additionally the lower end 114 may comprise a horizontal surface (not shown) engaging the edges of the track 108 to form the reservoir 200*a*.

In accordance with some embodiments, a method 1000 of lubricating a garage door track is provided. The method may comprise placing a reservoir, such as the reservoirs described herein, at a lower end of a garage door track, as shown at block 1002. This may involve either forming the reservoir as an integral component of the track, or placing the reservoir in a cooperating engagement (e.g., clamping, friction fit, close fit, affixed to) with the track. At block 1004, a lubricant is added to the fluid reservoir. The method 1000 may further comprise lowering a garage door to a closed position, such that at least a portion of a roller of the garage door is received into the reservoir at block 1006. This will cover the portion of the roller in the reservoir in the lubricant. At block 1008, the garage door is opened. This will move the roller from the reservoir and along the garage door track, spreading the lubricating fluid. The spread lubricating fluid may then contact other rolls, for example, during a closing of the door, thereby lubricating the track and the other rollers.

The method 1000 may further comprise affixing the reservoir to, for example, the ground or so other structure located proximate to the garage door track. The method 1000 may further comprise applying a lubricant to the rollers of garage door, and collecting the lubricant in the reservoir. The method 100 may further comprise placing the reservoir on the lower end of a garage door track in a factory. The method 100 may further comprise placing the reservoir on the lower end of a garage door track in the field, e.g., at a location at which the garage door is to be installed.

The garage door lubricating systems and methods described herein the present disclosure have several advantages. For example, they greatly reduce the likelihood of the lubricant finding its way to the ground or floor near the garage door tracks. This lessens the likelihood of slip hazards and the chance that the lubricant will find its way into the environment. Further, this saves lubricant that would otherwise be wasted. Additionally, the described systems and methods result in a more efficient lubrication of the garage door rollers and tracks by utilizing the movement of the garage door rollers to facilitate the lubrication. Other benefits include improved corrosion resistance of the garage door track.

Various terms, e.g., vertical and horizontal, have been used herein in their ordinary sense to describe the various embodiments of the reservoir. A person of ordinary skill in the art, understands that the reservoirs may vary from a truly or perfectly vertical or horizontal orientation. A person of ordinary skill in the art understands that the use of "vertical" and "horizontal" in this disclosure may be replaced with equivalent descriptions of the structures disclosed using other terminology.

While various embodiments have been described, it is to be understood that the embodiments described are illustrative only and the scope of the invention is to be defined solely by the claims when accorded a full range of equivalence, many variations and modifications naturally occurring to those of skill in the art from a perusal hereof.

I claim:

1. A device for lubricating garage door tracks, comprising:

a fluid reservoir configured for frictional engagement with a lower end of a garage door track, the fluid reservoir comprising:

a horizontal surface;

four walls, each wall having an upper end and a lower end, where the lower end of each wall is connected to the horizontal surface thereby defining the fluid reservoir, bounded by an inner surface of each wall and the horizontal surface, for the retention of a lubricating substance; and an opening defined by the upper end of the four walls, the opening dimensioned for frictional engagement with a lower end of a garage door track; and wherein at least one of the walls has a height dimensioned so that a portion of a garage door roller is accepted into the fluid reservoir when the garage door is fully closed.

2. The device of 1, wherein the horizontal surface and four wall are molded as a single piece of flexible material.

3. The device of 2, wherein the flexible material is one of rubber, plastic, vinyl, silicone, and neoprene.

4. The device of 1, wherein the fluid reservoir is further clamped to the lower end of garage door track.

5. The device of 1, wherein at least the upper end of three walls are in frictional engagement with the lower end of the garage door track.

6. The device of 1, wherein the height is dimensioned such that it is approximately equal to a height above the ground of a component operably engaged to the roller at a location proximate to a side of the garage door track when the garage door is closed.

7. The device of 6, wherein the component is a stem of the roller.

8. The device of 1, wherein the height is dimensioned such that the at least one of the walls avoids interfering with the garage door.

9. The device of 1, further comprising a lubricant absorbing material placed in the fluid reservoir.

10. The device of 9, further comprising a component for retaining the lubricant absorbing material.

11. A method of lubricating a garage door track, comprising:

placing a fluid reservoir in cooperating engagement with a lower end of a garage door track;

adding a lubricant to the fluid reservoir;

lowering the garage door so that at least a portion of a roller on the garage door is received into the fluid reservoir; and opening the garage door to thereby move the roller from the fluid reservoir and along the track of the garage door.

12. The method of 11, wherein placing the fluid reservoir comprises placing the fluid reservoir on the lower end of a garage door track at a factory.

13. The method of 11, wherein placing the fluid reservoir comprises is placing the fluid reservoir on the lower end of a garage door track in the field.

14. A system for lubricating a garage door track, comprising:

a fluid reservoir located at a lower end of the garage door track, the fluid reservoir comprising:

a horizontal surface;

one or more vertical surfaces operably coupled to the horizontal surface thereby defining the fluid reservoir, bounded by an inner surface of each of the one or more vertical surfaces and the horizontal surface, for the retention of a lubricating substance; and an opening defined by the upper end of the one or more vertical surfaces, dimensioned for the acceptance of a garage door roller and for cooperating with the garage door track.

15. The system of 14, wherein the fluid reservoir is an integral component of the garage door track.

16. The system of 14, wherein the fluid reservoir cooperates with the garage door track to form the fluid reservoir.

17. The system of 14, wherein the fluid reservoir is removably attached to the garage door track.

18. The system of 14, wherein the fluid reservoir is supported by a surface nearer the lower end of the garage door track.

19. The system of 14, wherein at least one of the horizontal surface and one or more vertical surfaces are solid.

20. The system of 14, wherein each of the horizontal surface and one or more vertical surfaces are solid.

* * * * *